United States Patent
George et al.

(10) Patent No.: US 8,538,954 B2
(45) Date of Patent: Sep. 17, 2013

(54) AGGREGATE FUNCTION PARTITIONS FOR DISTRIBUTED PROCESSING

(75) Inventors: Muthian George, Fremont, CA (US); Song Wang, Mountain View, CA (US); Ahmed K Ezzat, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/364,155

(22) Filed: Feb. 1, 2012

(65) Prior Publication Data

US 2012/0191699 A1  Jul. 26, 2012

Related U.S. Application Data

(63) Continuation-in-part of application No. PCT/US2011/022437, filed on Jan. 25, 2011.

(51) Int. Cl.
*G06F 17/30* (2006.01)

(52) U.S. Cl.
USPC .......................................................... 707/718

(58) Field of Classification Search
USPC .......................................................... 707/718
See application file for complete search history.

(56) References Cited

U.S. PATENT DOCUMENTS

| | | | |
|---|---|---|---|
| 5,742,806 A | 4/1998 | Reiner et al. | |
| 6,421,665 B1 | 7/2002 | Brye et al. | |
| 6,775,682 B1 | 8/2004 | Ballamkonda et al. | |
| 2005/0177579 A1* | 8/2005 | Blakeley et al. | 707/100 |
| 2006/0218123 A1 | 9/2006 | Chowdhuri et al. | |
| 2010/0241646 A1* | 9/2010 | Friedman et al. | 707/764 |
| 2011/0047172 A1 | 2/2011 | Chen et al. | |
| 2011/0161356 A1* | 6/2011 | de Castro Alves et al. | 707/769 |

OTHER PUBLICATIONS

Extend UDF Technology for Integrated Analytics, Qiming Chen, Meichun Hsu, and Rui Liu, HP Labs, Palo Alto, California, USA and HP Labs, Beijing China, T.B. Pedersen, M.K. Mohania, and A M. Tjoa (Eds.): DaWaK 2009, LNCS 5691, pp. 256-270, 2009. © Springer-Verlag Berlin Heidelberg 2009.*
Data-Continuous SQL Process Model, Qiming Chen and Meichun Hsu, HP Labs Palo Alto, California, USA Hewlett Packard Co, R. Meersman and Z. Tari (Eds.): OTM 2008, Part I, LNCS 5331, pp. 175-192, 2008. © Springer-Verlag Berlin Heidelberg 2008.*

\* cited by examiner

*Primary Examiner* — Kimberly Wilson
*Assistant Examiner* — Hau H Hoang

(57) ABSTRACT

Systems and apparatuses are provided for a distributed aggregate user defined function processing system. A non-transitory computer readable medium stores instructions for a query compiler to identify a call to a distributed aggregate user defined function within a query of the distributed analytical data processing system, retrieve metadata associated with the distributed aggregate user defined function, and validate and resolve respective inputs and outputs of a plurality of function partitions associated with the distributed aggregate user defined function according to the retrieved metadata. A distributed processing engine includes a plurality of processing nodes to execute the plurality of function partitions and organize data flow from the plurality of function partitions to produce an output for the distributed aggregate user defined function.

13 Claims, 3 Drawing Sheets

AGGREGATE FUNCTION PARTITIONS FOR DISTRIBUTED PROCESSING

RELATED APPLICATION

This application claims priority from and is a Continuation-in-Part of International Application No. PCT/US11/22437 filed on 25 Jan. 2011, the entirety of which is hereby incorporated by reference.

BACKGROUND

Analytical processing systems consume tables of data which are typically linked together by relationships that simplify the storage of data and make queries of the data more efficient. A standardized query language, such as Structured Query Language (SQL), can be used for creating and operating relational databases. Analytics involving statistical and other numerical procedures is the application of computer technology to solve problems in business and industry. The science of analytics is concerned with extracting useful properties of data using computable functions and, generally speaking, involves the extraction of desired properties of data sets from large databases.

Massively parallel processing (MPP) cluster database architectures deploy many computing nodes usually in a local high bandwidth network. MPP database architectures not only partition and manage data across computing nodes, but may also redundantly store data in replication nodes for data security and high performance query processing. Online analytical processing (OLAP) functions in MPP databases may flood the network with data rows moving from storage nodes to function processing nodes according to OLAP data partition specification. Typically, OLAP function processing starts after each function processing node receives the complete data partition set.

DETAILED DESCRIPTION

Figure 1:
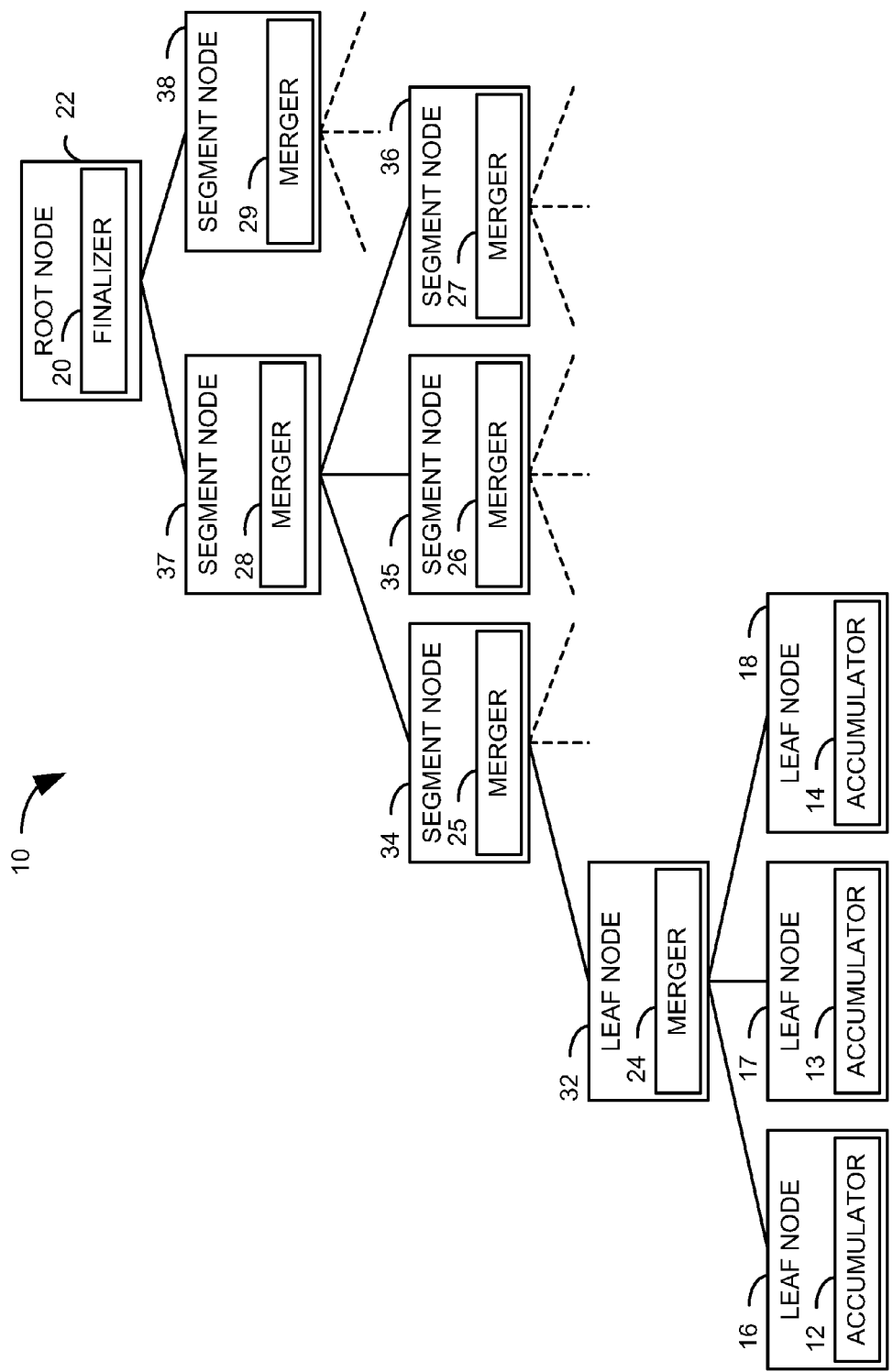
FIG. 1 illustrates a schematic implementation of aggregate partition functions for distributed processing in an MPP database.

Aggregate functions, used generally herein to describe functions that reduce the number of input rows to produce the output rows, represent a major class of analytical functions. As used herein, the category of aggregate functions can include a standard aggregate class type of functions that return one output row after processing all input rows, and a multiple row returning aggregate (MRRA) class type of functions that return more than one output row, but generally significantly less than the total number of input rows processed. The complexity of aggregate functions processing varies from simple function processing, such as sum, min, and max functions, to complex function processing, such as multiple regression and least squares analyses.

Massively parallel processing (MPP) databases are generally built using commodity hardware as a low cost, efficient alternative for massive data storage and concurrent processing of many complex queries. In MPP database architectures, queries with simple to complex OLAP functions, including aggregate functions, are processed in distributed and concurrent processes where rows from storage nodes are distributed by key partitions to processing nodes. Each processing node receives a set of rows belonging to a key partition and processes them as a group in an OLAP function. A node can receive multiple of such row sets and each row set is processed as a key partition group separately. A general review of aggregate functions shows that a majority of them generate a set of intermediate result fields from the input rows first. At the end of processing the input rows, the intermediate result fields are used for producing the output for the function.

For the systems and methods described herein, aggregate functions can be partitioned into accumulator, merger, and finalizer function partitions for efficient distributed processing. The intermediate results generated by the aggregate function are characterized by the reduction of the number of rows produced compared to the number of input rows. Any aggregate function in which intermediate results can be generated concurrently in each node and merged together without a loss of information is a candidate function for partitioning for distributed processing. The intermediate results can be produced and merged together irrespective of the order in which the input rows are processed.

The systems and methods described herein make it possible to process aggregate function partitions, namely, accumulator, merger, and finalizer partitions, in a distributed MPP database architecture. Specifically, a metadata model for capturing the semantic content of the distributed aggregate user defined function can be employed so that the function expression in the query can be syntactically and semantically validated and resolved at the time of query compilation. Syntax is validated at the query parser and function semantics are validated and resolved at a validation and resolution function supplied as a function pointer in the metadata of the distributed aggregate user defined function. The systems and methods developed around the metadata model provide the basis for distributed processing of distributed aggregate user defined functions as function partitions in the nodes of an MPP database management system. Such an implementation may generate an output result for the aggregate function more quickly for two reasons. First, the function concurrently accumulates intermediate results for each key partition in the data storage nodes. Second, they distribute only the intermediate results from the data storage nodes which are usually very small compared to the total number of input rows, diminishing the data flow in the cluster network considerably.

Distributed processing is not limited to aggregate functions only. For example, in sorting applications, data sorting can be performed concurrently in data storage nodes and merged together in merger and finalizer nodes. Though significant performance improvements can be made by distributed sorting, the number of rows distributed across the cluster network remains equal to the total number of input rows; in data sorting, the intermediate result will not reduce the number of input rows. Just like data sorting, many analytical functions can be implemented as distributed function partitions, similar to distributed aggregate function partitions. Such function implementations do not provide the benefit of reducing the intermediate results, but allow for efficient distributed processing. In contrast, distributed aggregate function partitions bring the benefits of high performance distributed processing by generating intermediate results concurrently in or closer to data storage nodes and reducing the network data flooding by distributing only the reduced intermediate results across the network.

An average (AVG) function is one such aggregate function that can be partitioned into accumulator, merger, and finalizer function partitions for distributed processing in an MPP database management system. For the computation of an average aggregate function, sum and count values are accumulated as the intermediate result in or closer to the data storage node in the accumulator function partition. Sum and count can be generated in any order of the input rows. Moreover, sum and count can be merged together in any order in the merger function partition. There can be any number of tiers of merger function partition processing nodes in between the leaf accumulator processing nodes and the root finalizer processing node. In the finalizer function partition, multiple intermediate results of sum and count, coming from leaf or merger nodes, are merged together before the final result, average, is computed.

Aggregate function partitions exhibit and share a distinct signature of intermediate result fields. The accumulator function generates the signature of the intermediate result fields in its output result from the input field arguments of the distributed aggregate user defined function in the query. The merger function uses the intermediate result fields as its input and output. The finalizer function uses the intermediate result fields as its input fields. The accumulator function is the consumer of input field arguments from the distributed aggregate user defined function, and the finalizer function is the producer of user output result for the aggregate user defined function in the query. In between the input provided to the aggregate function and the output of the aggregate function, data are processed in the signature of intermediate result fields even if intermediate results are merged in multiple tiers. Thus, the accumulator, merger, and finalizer function partitions can be configured for dataflow across many nodes to consume the input argument fields at the data storage nodes, to pass through the intermediate result from the accumulator nodes to the merger nodes, and to produce the final result in the finalizer node after merging the intermediate results. For example, sum and count intermediate results generated in the average accumulator function partition can be merged in a processing dataflow with multiple tiers of the merger function partition in nodes in between the leaf accumulator nodes and root finalizer nodes.

An aggregate function can be implemented as distributed aggregate function partitions or as a regular single function implementation where both the implementations have exactly the same user input and output field representations for the aggregate function in a query. A regular single function implementation does not have multiple partitions and is not amendable to distributed processing. A single function implementation takes a set of rows belonging to a key partition and processes them in a single node. However, the distributed aggregate user defined function partitions additionally have the intermediate result fields in the output of the accumulator and merger, and input of the merger and finalizer function partitions. Thus, an aggregate single function can be implemented and executed with table objects of input and output fields and does not explicitly expose the processing of intermediate results. However, a distributed aggregate function has to be implemented as partition functions and each partition function executed separately with table objects of input and output fields. For the accumulator function partition implementation, the query input fields and intermediate result fields are used as input and output fields. For the merger function partition, the intermediate result fields are used as input and output fields. For the finalizer function, the intermediate result fields are used as input fields and the user result output fields are used as output fields.

There are separate input and output field metadata objects for each of the distributed aggregate function partitions. It is possible to build an intermediate result field metadata and share the output field metadata with the accumulator and merger function partitions, and the input field metadata with merger and finalizer function partitions. All the function partitions may share the same parameter metadata when there are parameter fields. While processing a function partition, the distributed processing system deals with each function partition as a separate function in a processing node once the execution plan is prepared as nodes of a distributed directed acyclic tree structure of function partition processing nodes. Each output field has a unique name within a function partition, specified in the user defined function (UDF) output field metadata. There is one function partition output field metadata object for each output field, such that for N output fields for a function partition, there are N output field metadata objects in an array. Similarly, there are arrays of input and parameter field metadata objects for each distributed aggregate user defined function partition.

Input, output, and parameter metadata arrays are packaged together in a function partition metadata object along with additional information. The function partition metadata object may be built by the UDF developer as an immutable static object that is compiled along with the processing code of the function partition. Each of the distributed aggregate function partition processing code consists of an implementation of a UDF interface class, a factory constructor function to create an instance of the function partition processing object, and the validation and resolution utility function if the function partition requires a special utility function. If the special utility function is not required, a general purpose utility function supplied with the system may be used for the validation and resolution of a function partition. Similarly, a distributed aggregate function level validation and resolution utility function may be supplied with the system for the validation and resolution of query input, output, and parameter fields in case no special such utility function is defined for the distributed aggregate function. The validation and resolution of input, output, and parameters may be handled in a distributed aggregate function validation component of the SQL compiler.

In an MPP database installation, implementations of a single aggregate function and distributed aggregate function partitions can co-exist using the same aggregate function name. For aggregate functions that cannot be processed with a distributed aggregate function partitions, only the single aggregate function is implemented and made available. The SQL compiler can select either one of the implementations for a given aggregate function name according to the query plan of execution it generates. If there is no implementation of distributed aggregate function partitions, it selects only the single aggregate function implementation. If the compiler selects the distributed aggregate function partitions for execution when the distributed implementation is present in the system, it generates an execution plan that sets up the processing of the aggregate function partitions starting from the leaf nodes of accumulator with zero or more tiers of merger nodes in the middle and ending the tree of execution nodes with one finalizer root node.

FIG. 1 illustrates a schematic implementation of an MPP database architecture 10. In this architecture, distributed OLAP aggregate functions can be partitioned at least into two parts. A first part of the aggregate function partition, referred to herein as an accumulator function 12-14, accumulates the intermediate results from the input rows at the leaf nodes 16-18 where data rows reside. A finalizer function 20, located at a root node 22, merges intermediate results received from multiple accumulators and computes the final result for the aggregate function. In multiple tier MPP architectures, a third function partition, referred to as a merger function 24-29, can be interposed between the accumulator and the finalizer functions at a leaf node 32 and segment nodes 34-38 within intermediate tiers of the architecture to merge the intermediate results returned by child processes, including accumulator or other merger functions. It will be appreciated that each of the nodes 16-18, 22, 32, and 34-38 can include a processor and a non-transitory computer readable medium storing one or more data tables as partitions in or closer to leaf nodes 16-18 and machine readable instructions for performing their associated functions 12-14, 20, and 24-29.

When datasets are very large, MPP database architectures are often setup for multi-tier processing, particularly for distributed aggregate function partitions. In the leaf nodes 12-14, multiple accumulators can accumulate the intermediate result from subsets of input rows based on key partitions that are merged together by one merger function (e.g., 24). High-performance MPP architectures are setup as interconnected multiple segments of nodes where segments can be configured in the same or different networks. In segmented architectures, accumulated intermediate results from each segment are merged by a single process executing the merger function 25-29. The finalizer function 20 in the root node 22 merges all the intermediate results received either from the merger 24-29 or accumulator 12-14 processes and computes the final result for the function.

To this end, one example of an MPP database architecture can process aggregate functions implemented as distributed aggregate function partitions, namely, accumulator, merger, and finalizer function partitions where each function partition is an independently executable function. At the time of the implementation of the distributed aggregate functions, the function partitions are packaged together into a distributed aggregate function metadata that consists of accumulator, merger, and finalizer partition function metadata and an output dependency metadata. It is possible that a distributed aggregate function does not have the implementation of a merger function partition. In such cases, the merger function partition metadata may be set to a null pointer in the distributed aggregate function metadata.

The metadata implementation of a distributed aggregate function partition resembles that of a single aggregate function metadata. It consists of a UDF name, description, class type, a factory constructor to create an executable instance of the function partition at runtime and arrays of input, output, and parameter fields. It also contains a function pointer to validate and resolve the input, output, and parameter fields for the function partition at aggregate function query compile time if there is one such validation and resolution utility function implementation. If the validation and resolution utility function pointer is set to a null pointer, a general purpose validation and resolution utility function is available with the system for the validation and resolution of input, output, and parameter fields of the function partitions at query compile time.

The distributed aggregate function metadata contains an output dependency metadata. An output dependency metadata defines the relationship between each output field for the aggregate function and one or more intermediate result fields. In other words, it indicates the names of intermediate result fields that are required to compute an output field for the distributed aggregate function. At the time of query compilation, the validation and resolution utility function uses the output dependency metadata for generating the intermediate result fields required for processing the output fields for the distributed aggregate function in the user query.

In the implementation of user defined functions, the applications are at liberty to request the query output fields from the aggregate function in any order having all the fields or only a subset of output fields. This is true for the single aggregate or distributed aggregate function implementations. Mapping intermediate result fields according to the query output fields could produce only a subset of intermediate result fields for the distributed aggregate functions. Therefore, while processing the intermediate result fields, the function partitions may handle situations in which an intermediate field can be present or absent. This is in contrast to single aggregate function implementations where all the input fields are supplied in the order they are required for the function for processing. At the time of query compilation, the input and output field resolution and validation utility function supplied in the metadata of the distributed aggregate function implementation or, in its absence, the general purpose utility function supplied in the system generates the correct set of intermediate result fields for the distributed aggregate function. The resolution and validation utility function selects a unique set of intermediate result fields by mapping the query output fields with the help of the output dependency metadata and orders the list of intermediate result fields according to the order in which the intermediate metadata fields are defined in the function implementation.

The utility function may also generate an identifier number for each of the intermediate result fields that identifies it to the respective intermediate metadata field for the function partition. As will be described in detail below, input and output fields of the distributed aggregate function can contain variable fields, in which a given field can represent a differing number of variant fields in each instantiation of the function. If variable fields are involved in the intermediate result fields, the variant field identifier for each variable field starting from zero to one less of the total number of variants is also generated. Thus, at the time of processing a distributed aggregate function, each function partition identifies correctly each intermediate result field in its input or output fields with the help of these identifiers and sets up the correct processing procedures for the intermediate result fields.

For example, consider a distributed aggregate processing function that processes the statistics of a single input field to output sum, count, average, variation, standard deviation, standard error, and coefficient of variation. For computing all the output fields, sum, count, and sum of squares have to be generated as the intermediate result fields. When the user application requests only count as the query output field, the function has to accumulate only count in the intermediate result. When the application requires only sum in the query output, it needs to accumulate only sum in the intermediate result. When the function requires average as the query output field, accumulator generates sum and count intermediate result fields. For standard deviation, variation, standard error, and coefficient of variation as query output fields, all the intermediate result fields are produced in the accumulator function partition. Thus, the number of intermediate result fields has a direct bearing upon the output fields requested in a distributed aggregate function. Therefore, the input fields for the merger and finalizer functions have to deal with often missing input fields. The field identifiers that identify an intermediate result field with respect to the intermediate metadata field helps the merger and finalizer functions to correctly generate the processing procedure to compute the intermediate result field. When the intermediate result field is a variable field, the variant field identifier identifies the intermediate variant result field within the identified field in order for the function partition to use the right input variant field and processing procedure needed for generating the intermediate variant result field.

The query compiler of the MPP database retrieves the distributed aggregate function metadata at the time of query compilation. The query compiler uses the metadata of the distributed aggregate function to resolve and validate the input, output, and parameter fields using the validation and resolution utility function for the aggregate function implementation if such a function is available as a function pointer in the metadata. If the function pointer is null, the compiler uses a general purpose validation and resolution utility function to validate the distributed aggregate function. The validation and resolution function not only resolves the input and output fields from the query, but also returns the intermediate result fields. Note that the output of the accumulator and merger functions, and the input of the merger and finalizer functions have the same field metadata signature because they represent the intermediate result fields. The query compiler uses the intermediate result fields along with the input and output fields from the distributed aggregate user defined function in the query for generating the input and output fields of each aggregate function partition. For efficient distributed processing of aggregate functions, the query compiler generates an appropriate execution plan according to the MPP database installation for executing the accumulator, merger, and finalizer function partitions associated with the aggregate function.

Figure 2:
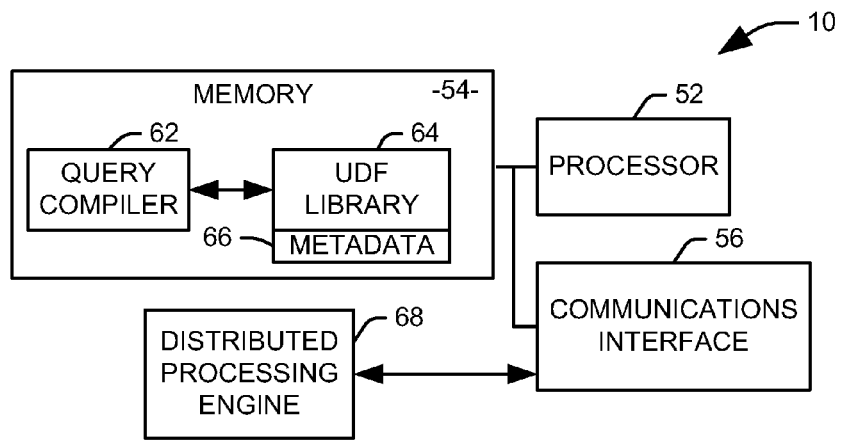
FIG. 2 illustrates an example of a distributed analytical processing system in which aggregate user defined functions (UDFs) are partitioned into a plurality of function partitions.

FIG. 2 illustrates an example of a distributed analytical processing system 50 in which distributed aggregate user defined functions (UDFs) are partitioned into a plurality of function partitions and regulated via metadata that consists of metadata for function partitions and output dependency metadata. For example, the system 50 of FIG. 2 can represent a database system, a data warehouse, a data mart, an in-memory database, a standalone OLAP engine, a business intelligence report generation system, a data mining system, or a federated query processing system. The system 50 includes a processor 52 and a memory 54 connected to a communications interface 56. It will be appreciated that the communication interface 56 can include any appropriate hardware and machine readable instructions for receiving queries from an associated query source (not shown) and returning the results of the queries to the query client. Accordingly, the communications interface 56 can include any or all of a bus or similar data connection within a computer system or a wired or wireless network adapter. The memory 54 can include any non-transitory storage devices suitable for use with computer systems, such as magnetic and optical storage media.

The memory 54 can include a query compiler 62 and a user defined function (UDF) library 64 including a distributed aggregate user defined function. The query compiler 62 can utilize any appropriate query language, for example, structured query language (SQL) or multidimensional expression (MDX) language. In one implementation, the user defined function library 64 stores its associated user defined functions as one of a shared object or a dynamic link library where the library 64 is loaded dynamically at query compile time from a list of such libraries or loaded into the system at system start up time. There can be one or more user defined functions in each implementation of library 64 either as single aggregate user defined function or as distributed aggregate user defined function using the same function name. Each implementation of single aggregate or distributed aggregate user defined function in the library 64 exposes metadata 66 to the query compiler 62. The query compiler 62 retrieves the function metadata whether single aggregate or distributed aggregate user defined function according to the query execution plan it generates.

The query compiler 62 can identify a call to a user defined function within a query and retrieve metadata 66 associated with the called user defined function from the list of single or distributed aggregate user defined function implementations. The metadata indicates if the function is of aggregate class type. The query compiler 62 can retrieve the metadata for a single or a distributed aggregate user defined function with the same function name and select either the single or distributed aggregate function implementation for the query execution plan generation. When only one of the implementations is available, it is used for generating the query execution plan. When single and distributed aggregate user defined functions are implemented, the query compiler 62 can select either one according to optimization considerations.

In one implementation, the call to the user defined function can include an input expression, defining the input fields provided to the function, and an output expression, defining the desired output fields from the function. The query compiler 62 validates and resolves the input and output expressions in the call to the user defined function. It will be appreciated that not every function call will have explicitly specified output fields, and that when output fields are not specified in a call to the user defined function, default output fields defined in the metadata of the user defined function can be output for the function. It will further be appreciated that the list of output expressions in a call to the user defined function can represent a proper subset (i.e., less than all) of the output fields associated with the user defined function in any order irrespective of the order in which they are defined in the function metadata. Whether the output fields from the query or default fields are used for a distributed aggregate function, intermediate result fields are generated using the output fields with the help of the dependency output metadata at the time of query compilation.

In the illustrated example, the user defined function is executed at a distributed processing engine 68. For example, the distributed processing engine 68 can be implemented as part of a massively parallel processing (MPP) database architecture, such as the architecture illustrated in FIG. 1. The distributed processing engine 68 partitions and manages data in multiple computer nodes within the database cluster. To this end, when the user defined function is a distributed aggregate function, processing can be performed in multiple steps. Specifically, input rows at each node can be accumulated concurrently into intermediate result fields, and these intermediate result fields can be further merged until the final output result fields for the aggregate user defined function are computed. For distributed concurrent processing in MPP cluster databases, aggregation functions are partitioned into leaf nodes with the accumulator function, intermediate tiers of merger function nodes to merge the results of the leaf nodes, and the root node of the system containing a finalizer function to merge the results from multiple merger or accumulator nodes and to compute the final result from the merged intermediate results.

The query compiler 62 generates a query execution plan that consists of processing of local storage or closer to a storage node with accumulator and merger functions, a root finalizer node and merger nodes in between the finalizer and leaf nodes. In multiple core computer nodes, multiple processes or threads in a single process execute the accumulator function, each for a key partition data, in parallel to produce intermediate results from subsets of rows scanned locally or from the nearest data storage node. Each computer node executes a merger function in a process or thread and merges multiple intermediate results from accumulators before sending the intermediate results in the cluster network. For this, the query compiler 62 sets up a local execution plan consisting of many leaf accumulators supplying the intermediate result fields to a single merger function partition and the query executor executes the nodes setting up the dataflow from accumulators to the merger node. The intermediate result produced by the local merge function is distributed according to key partitions in the cluster network for further merge and final processing.

To allow for flexibility in such applications, input and output fields can be marked as fixed or variable types in the input and output metadata of each distributed aggregate user defined function. A fixed field must always have only one corresponding field whereas a variable field can have zero, one or more number of variant fields at query compile time. A distributed aggregate function can have one or more variable fields in input, output and intermediate result fields defined in the metadata of function partitions. Distributed aggregate functions with variable input fields with one or more variable input fields may or may not have variable intermediate result fields, depending on the particular function implementation. When there are variable output fields, there will generally, but not necessarily, be corresponding intermediate variable result fields. For example, when a multiple regression function is implemented as a distributed function, it has variable input, intermediate result and output fields corresponding to the number of independent fields used in the regression model. At compile time, the number of independent field variants is known either through a parameter field or deduced by computation when there is only one variable field for the distributed aggregate function. The validation and resolution utility function for the distributed aggregate function uses the metadata for the distributed aggregate function and the input, output, and parameter fields from the aggregate user defined function in the query to resolve the variable input, intermediate result and output fields.

The data type of a field can be of fixed data type or of undefined data type. For all fields with fixed data type, the fixed data type will be used. When the input field is not of the data type of its corresponding input field metadata, the input argument field is converted to the type of the input field metadata at query compile time. However, for an undefined data type, the data types are resolved at the time of query compilation. The resolution of the data type is different for input and output fields. Input fields acquire their data types from the input field arguments at compile time. Output field data types are defined with by reference to the input field it is set to depend upon. Similar to a single user defined function implementation, the query output fields of a distributed aggregate function could be set to depend upon an input field when the data type of the output field of its constituent function partitions is set as undefined or when the query output field is a variable field and there is only one such variable field. In addition, an input or query output variable field could be set to depend upon an integer parameter field for its repetition count resolution at query compile time. In the case of the distributed aggregate functions, setting such dependency resolutions is extended to the intermediate result fields as well. Intermediate result fields could be set to depend upon input fields or parameter fields or both. In the case of a single user defined function implementation when there is a requirement for a special validation and resolution function for the resolution of input, output, and parameter fields, a validation and resolution utility function is built along with the user defined function and supplied as a function pointer in the metadata of the user defined function. Similarly, in the case of the distributed aggregate functions, there could be a validation and resolution utility function set as a function pointer in each of the function partition metadata and one in the distributed aggregate metadata itself for the resolution and validation of all the function partitions as well as the whole implementation of the distributed aggregate user defined function. When there is no specific function pointers set in the distributed aggregate function metadata, the SQL compiler uses general purpose validation and resolution utility functions for the validation and resolution of input, output, and parameter fields and the generation of intermediate result fields. For the validation and resolution of function partitions, the validation and resolution utility function for function partitions addresses cases where one or more input fields could be missing for the merger and finalizer function partitions, which is different from the utility function for a single user defined function implementation.

The validation and resolution utility functions of distributed aggregate function partitions and the validation and resolution utility function for the whole function are used for the validation and resolution of input, intermediate result and output fields in multiple steps in a set sequence at the time of compiling a query with a distributed aggregate user defined function. In a first step, the data type of the input fields from the accumulator function partition are resolved when they are set as undefined in the input field metadata. When the data types in the input fields are different from the input metadata fields, appropriate data type validation and promotion is set up. The field size and null indicator from the query input argument field is also obtained while constructing the query input fields. In the second step, the variable input fields in the accumulator function partition are resolved. When there is only one variable input field which is not set to depend upon a parameter field, it is resolved by subtracting the total number of fixed fields in the input metadata from the total number of input field arguments in the query. When one or more variable input fields are set to depend upon integer parameter fields, parameters are used for the resolution of repetition variable field count for the variable fields. In the third step, the query output fields in the finalizer function partition are resolved. Query output fields could be a subset of the total query output fields defined for the function. When query output fields are not given in the query mapping of the distributed aggregate function, query output fields marked as default are automatically used. When there is only one query output field that has a name set as '*', all the query output fields are selected and used in query output processing. When a query output field is set to depend upon an input field from the accumulator function partition for its data type or variable field repetition count resolution, the resolved input field from the accumulator function partition is used for the resolution of the query output field. When integer parameters are given for the resolution of the repetition count for the query variable output field, the parameter values are retrieved and used for generating the variable field repetition count and the variant fields. In the fourth and final step, the intermediate result fields are generated. The resolved output fields from the finalizer function partition are used in conjunction with the output dependency metadata for identifying and retrieving a unique set of intermediate result fields required for computing the query output fields. If the data type of an intermediate result field is set as undefined, the data type of the input field from the accumulator partition function on which it is set to depend is used. In the selected intermediate result fields, if there are variable fields, they are resolved with respect to the integer parameter fields or input variable fields from the accumulator partition function on which the field is set to depend. Integer parameter fields used for the resolution of repetition count for the variable fields are mandatory fields and they must be given. However, when the parameter fields have default values, such parameter fields are not mandatory, and the validation and resolution utility function retrieves and uses the default parameter value. When parameter fields are used, the repetition count given in the parameter fields are always used in the resolution of all the function partitions. Note that the intermediate result fields are the output fields of the accumulator and merger functions, and the input fields of the merger and finalizer functions as well. The query compiler 62 uses the resolution and validation utility function for the distributed aggregate function for the validation and resolution of query input, output, and parameter fields. This utility function uses the validation and resolution utility function of the aggregate function partitions for the validation and resolution of input, output, and parameter fields at the function partition level. When a query output field or intermediate result field is set to depend upon a query input field, the size of the field and the null indicator are also inherited from the query input argument field. Note that the parameter fields are common for all the function partitions. On the completion of the validation and resolution processing, the query compiler 62 receives the fully resolved input, output and intermediate result fields from the validation and resolution utility function. The query compiler 62 uses the input, output and intermediate result field arrays, thus, resolved and validated, for setting up the processing of aggregate function partitions as distributed processes along with OLAP key partitions in the cluster of computing nodes so that input rows are processed in the accumulator leaf nodes and the output from the accumulator is sent to the merger function processor as input and the merger's output as input to the finalizer to produce the query output result.

The listing of fields in the query output expression allows the output of a distributed aggregate user defined function to be mapped to a list of fields provided within the output field metadata of the finalizer function partition. The output fields can be mapped with position identifiers using the '$#' syntax where the '#' character represents a numeric value starting from an ordinal number of one and ending with the total number of query output fields for the distributed aggregate function at compile time. In the validation and resolution utility function, output fields named using position identifiers are substituted with the corresponding query output field names. If output variable fields are mapped using position identifiers using '$#' syntax or the variable field base name itself, the validation and resolution utility function substitutes position identifiers or the variable field base name with output field names generated by concatenating the variable field base name and the ordinal number of the variant field at query compile time. For example, if the base name of a variable field is 'foo' and the variant count is three, fields with variant field names 'foo1', 'foo2' and 'foo3' are generated.

The query compiler 62 compiles the query and generates an appropriate execution plan for the distributed processing engine according to the database cluster installation architecture. The compiler 62 generates the execution plan for distributed processing according to the cluster configuration. When a merger function is not given in the distributed aggregate multiple partition function metadata, the compiler 62 sets up the accumulator processes to send intermediate results directly to the finalizer in a two-tier processing architecture. When the merger function is given, the compiler 62 generates a three or more tier processing hierarchy of directed acyclic nodes according to the cluster architecture of the MPP database processing system.

Figure 3:
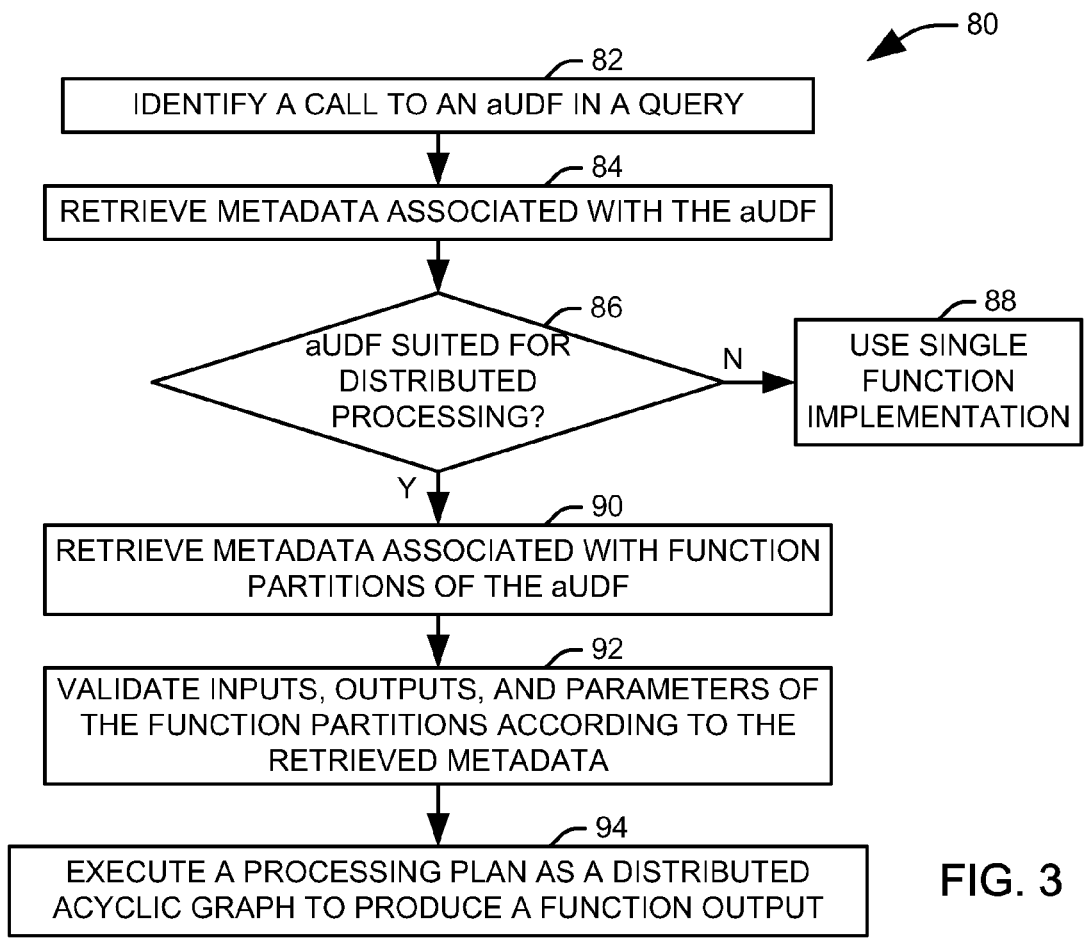
FIG. 3 illustrates a method for executing aggregate user defined function partitions for distributed processing on a massively parallel processing cluster database system.

FIG. 3 illustrates a method 80 for executing an aggregate user defined function on massively parallel processing cluster database system where an aggregate function with the same name can exist as an implementation of a single function and distributed function partitions. At 82, a call to an aggregate user defined function (aUDF) is identified within a query of the analytical data processing system. At 84, metadata associated with the aggregate user defined function for both single and distributed aggregate function partitions, if implemented, are retrieved. At 86, the appropriate aggregate function is chosen for execution. For example, when input fields of the aggregate functions are specified as distinct in the query, distributed aggregate function processing is inappropriate because it requires data sorting and elimination of duplicate rows except functions such as min and max. Therefore, functions such as min, max, and similar other aggregate functions that can be processed as distributed aggregate function partitions when there is a distinct specification in the query. Such aggregate functions must indicate that they are capable of distributed processing when distinct is specified in the input, which the SQL compiler can retrieve at the time of query compilation. For certain aggregate functions, such as a median function or computing a frequency distribution with the number of classes of a set of input rows, only a single function implementation is available and the method advances to 88 for processing the single function implementation. Similarly, if the compiler 62 decides for any optimization reason that distributed processing is not suitable (N) when the distributed function implementation exists, the method advances to 88, where a single function implementation is used for processing.

If the distributed aggregate user defined function is suited for distributed aggregate processing (Y), the methodology advances to 90, where metadata associated with each of a plurality of constituent user defined function partitions associated with the aggregate user defined function is retrieved along with the output dependency metadata. The validation and resolution utility function is called for the validation and resolution of the query input, output, and parameters and the validation and resolution utility function returns the input, output, and intermediate result field arrays. At 92, respective inputs, outputs, and parameters of the plurality of constituent user defined function partitions are validated using the function partition level metadata and the validation and resolution utility function. For example, it can be determined that the order and number of inputs and outputs are in accordance with a given set of constituent user defined function partitions. Similarly, the dependency of the output fields of the distributed aggregate user defined function on various intermediate result fields from the constituent user defined functions can be checked to ensure that all necessary intermediate result fields can be calculated. At 94, a processing plan is generated as a distributed directed acyclic graph by setting up dataflow from the leaf node accumulators to the root node finalizer having merger nodes in between to represent the plurality of constituent user defined function partitions at a processing engine associated with the massively parallel processing cluster database system to generate the function output for the distributed aggregate user defined function.

Figure 4:
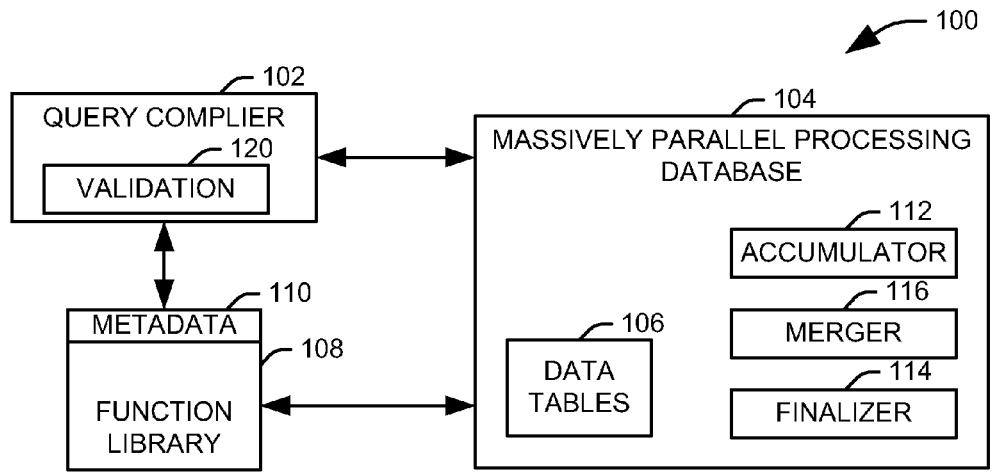
FIG. 4 illustrates a schematic diagram of one implementation of a system for querying a massively parallel database system involving an aggregate user defined function.

FIG. 4 illustrates a schematic diagram of one implementation of a system 100 for querying a massively parallel database system. The system 100 includes a query compiler 102 and a massively parallel processing (MPP) database 104 to compile and execute queries on data tables 106 distributed in partitions in the MPP database. The query compiler 102 identifies a call to a user defined function and input, output, and parameter expressions that may be available in the call to the user defined function. A parameter expression can include parameters provided by a user to make a user defined function adaptable to represent a general program model with variable fields. In one implementation, the user defined functions are built in a UDF library 108, for example, as shared objects or dynamic link libraries, and registered with the database engine. Each user defined function exposes a self-describing UDF metadata 110 that can be retrieved by the query compiler 102 for query resolution and validation in the resolution and validation utility function. The metadata of a distributed aggregate UDF is a self contained and describing object. It contains the function pointer for the validation and resolution utility, constituent metadata for function partitions, and output dependency metadata. Each constituent metadata for a function partition has its own factory constructor available as a function pointer to process the constituent function partition. Each constituent metadata of a function partition has the arrays of input, output, and parameter metadata fields. The constituent UDF metadata object contains the UDF name, UDF description, and class type.

It will be appreciated that the basic syntax for all user defined functions, regardless of their associated class type, can be standardized, such that they are parsed in a similar manner at the query compiler 102. In this syntax, query input arguments consist of fields or expressions composed from input field arguments from the SQL query table that can be composed into an input table object, query output arguments, as mapped in the query for the function, consist of output field names or expressions composed from output metadata field names from the user defined function that can be composed into an output table object, and parameter arguments are provided in the form of key/value pairs, where the key is the metadata parameter field name of the user defined function and the values for the field represented by the key can be composed into a parameter object. Parameter key/value pairs are separated from one another by a colon character. In SQL queries, the input arguments for UDFs come from query table fields and GROUP BY or OLAP PARTITION BY expressions produce subsets of rows into a table object with one or more input fields. Therefore, input field arguments from the query table are separated from query output fields and parameters to simplify UDF syntax in queries, which helps in processing different class types of UDFs using the same syntax. The same syntax applies to user defined function expressions in queries, including single and distributed aggregate functions, without any distinction. One example of the standardized syntax for expressing a user defined function in a query can include an expression such as:

<UDF name>([<Input Expression List>])[OUTPUT
       (<Output Expression List>)][[WITH]PARAM-
       ETER (<key=valueExpression>[: . . . ])]

In the above user defined function expression, items within brackets are optional, items within parentheses are mandatory, and items given within chevrons (< >) are replaced with appropriate expressions. The names of the user defined functions are unique and case-insensitive. The user defined functions support variable input and output fields composed as table objects. The various expression lists can comprise a series of comma separated items. The input expression list, if present, can include columns or expressions composed using columns from query table. A mapping for the output fields of the user defined function is provided using the keyword OUTPUT, with the output expression list comprising of one or more output fields or expressions composed from output fields. Output fields are field names from the user defined function output metadata or field position identifiers using "$#" syntax, where $ represents a special character and # represents an ordinal number of the output field left to right starting from one. When the output is not explicitly mapped in a query, default output fields defined within the user defined function can be returned. When output fields are represented by '*' as in OUTPUT(*), all the output fields from the user defined function are returned. Parameters are given as "key=valueExpression" separated by colons, using WITH PARAMETER syntax when a user defined function requires parameters. The "key" is the field name in the user defined function parameter metadata. The "valueExpression" is a constant or an expression that evaluates to a constant. The parameters defined in the expression can be dates, time, timestamps, integers, decimal values (double values), character strings, or comma separated array constants formed from one of these data types.

The query compiler 102 processes a call to a distributed aggregate user defined function in a database query using the standardized user defined function syntax in multiple steps. For each user defined function, the compiler 102 first parses the user defined function expression and collects the function name, input fields, output fields and parameter fields. The query compiler 102 retrieves the metadata of the function and looks at the class type. If the function is of aggregate class type, the query compiler 102 attempts to retrieve the distributed function metadata. If it returns a null pointer for the metadata, it indicates that there is no distributed aggregate function implementation. The query compiler 102 uses the validation and resolution utility function for the distributed aggregate user defined function to generate the input, output and intermediate result fields. The compiler 102 distinctly maps the input and output table objects for the accumulator 112, merger 116, and finalizer 114 function partitions using the input, output, and intermediate result fields returned by the validation and resolution utility function. For the accumulator, the compiler 102 constructs the input table with the input argument fields from the query and output table with the intermediate result fields. For the merger 116, the compiler 102 constructs the input and output table objects with the intermediate result fields. For the finalizer function 114, the compiler 102 uses the intermediate result fields for input table and query output fields for the output table object. The compiler 102 provides these table objects to the distributed processing system of the MPP database 104 for preparing the execution plan. The distributed processing system prepares a directed acyclic graph of execution nodes with aggregate function partitions starting from the accumulator function 112 at the leaf processing nodes and the finalizer 114 at the root node having between zero or more tiers of merger nodes according to the cluster architecture if the merger function partition is implemented. The table objects are self-describing with field names, data types, and data sizes to standardize processing of all user defined functions capable of handling multiple records simultaneously. Each table object has its own metadata to describe each field of the rows in the table object in terms of its field name, data type, data length, and indicator showing if the field has null values. Tables also have the ability to store and retrieve rows of data based on row number. They are capable of handling large row sets with the ability to manage memory overflow into disk files.

The metadata for each user defined function can also include an associated class type for each function out of a plurality of function class types to assist in the optimization of the query. The user defined function class types implicitly set the rules for data processing in the database engine along with the cardinality of their output results. For distributed aggregate function processing, only regular aggregate and MRRA function class types are considered. The query compiler differentiates these class types with respect to the cardinality of their output rows returned from the functions. Functions of the regular aggregate class type return only one row per set of input rows processed and are considered as determinate cardinality type. Functions of the MRRA function class type return an unknown number of output rows with respect to the number of input rows and, therefore, they are considered as indeterminate cardinality type. Unlike inbuilt functions that return only one output field, both regular aggregate and MRRA user defined function class types may return one or multiple output fields in a row.

The query compiler 102 establishes a plan for executing the received query, including any distributed aggregate user defined functions in the query. The query compiler 102 retrieves metadata describing the associated class types of the user defined functions, and uses the associated class type of each user defined function to determine if the number of rows in the output of the function is known or determinate and if the output to the function is unknown or indeterminate. For class types having known outputs, the query compiler 102 can proceed normally. Functions having indeterminate outputs are handled as part of an alternative optimization process, in which the potential impact of a function having a large number of output rows is mitigated.

In one instance, user defined functions can be associated with any of ten classes. Aggregate user defined functions process a set of rows partitioned by a GROUP BY expression or an OLAP window expression and return only one output row per input row set. A MRRA user defined function is similar to the aggregate functions except that MRRA functions return more than one row per set of rows processed. Aggregate functions, both regular and MRRA class types, are generally called as OLAP functions as they can be processed in sets grouped across partition keys in an OLAP windows processing environment.

When processing a distributed aggregate user defined function, the MPP database 104 processes the input rows in at least in two phases. In the first phase, the input rows are reduced into an intermediate result concurrently in multiple data storage nodes in the accumulator function. In the second phase, final result fields are computed in the root finalizer node after merging intermediate results arriving from multiple accumulator leaf nodes. In multiple tier cluster database architectures, intermediate results are merged together to produce output intermediate results in one or more middle tiers of merger nodes between leaf accumulator and root finalizer nodes. In general, the reduction process associated with the distributed aggregate functions takes place at all stages of processing starting from the accumulator leaf nodes. When a distributed aggregate function processes input rows in two phases, it can be partitioned into two separate functions 112 and 114. The first function, referred to as an accumulator 112, processes the input rows to produce a set of intermediate result fields, and the second function, referred to as a finalizer 114, computes the final result fields from the input of intermediate result fields. So, for two tier cluster database architectures, there is a root finalizer node 114 and a number of leaf accumulator nodes 112 for each key partition set. Even if more than one accumulator 112 is executed in the leaf computing node, all the accumulators are designed to send their intermediate results to the root finalizer function 114 for the respective key partition set.

MPP database architectures are deployed in varying levels of complexity. Cluster database installations running thousands of computing nodes can utilize a segmented architecture where each segment is configured in a separate local high-speed network with high-speed interconnect between segments. Having segmented architecture localizes computing and reduces flooding of network with data flow across nodes while processing. When each computing node has more than one core processor, multiple accumulators 112 in threads or processes can perform individual intermediate result accumulation from subsets of input data from the same partition set in the local node. At each such node, a merger function 116 is deployed in a thread or process to merge all the intermediate results generated by the accumulators. So, at the segment level, one merger function 116 is deployed for a data partition set in a process to merge all the intermediate results arriving from the leaf computing nodes. Installations running into tens of thousands of computing nodes may have one or more levels of segmented architecture where at each segment level a merger function is deployed per partition set. For the processing of each distributed partitioned aggregate function, one root node is required to deploy the finalizer function 114 for each key partition set of input rows. The finalizer 114 receives the intermediate results for each key partition set from each segment in the cluster which it merges first before computing the final results. Essentially, accumulator, merger, and finalizer functions 112, 116, and 114 are designed for distributed and concurrent processing of data partitions in distributed aggregate function partitions in MPP database installations.

It will be appreciated that, while most aggregate functions exhibit intermediate result processing in one form or another, not all aggregate functions are amenable to partitioned function processing. For example, aggregate functions that require all data together for processing, such as a median function, may not be implemented as distributed function partitions. Similarly, computing a frequency distribution with a parameter for the number of frequency classes of a set of input rows, which is an MRR aggregate function, requires two scans of the data, first scan is for finding the min and max values and the second scan is for computing the frequency interval for each input row. However, when the frequency distribution is performed with a parameter for interval value, it could be implemented as a distributed aggregate function. When a function is not a candidate for distributed aggregate processing, a single function implementation can be used.

Functions such as sum, min, and max have the same field signature for the input, output, and intermediate result. Also, for these functions input, intermediate, or final output has no distinction. Therefore, one function implementation can represent accumulator, merger, and finalizer function partitions, and in the place of accumulator, merger, and finalizer function partitions, the same function implementation can be used. A count function has the same computation of summing the intermediate results in the merger and finalizer function partitions while the accumulator increments an internal counter. Therefore, for the count function the same function partition implementation for performing summation can be used for merger and finalizer function partitions.

Usually, when data are partitioned and stored in multiple nodes, the distributed aggregate function implementation is used. The following query illustrates the dataflow between distributed aggregate function partitions:

SELECT S.country, S.product,
Reg(S.salesValue, A.advertizementCost)
OUTPUT(intercept, betaCoefficient)
FROM sales S, adCampaign A
WHERE S.country=A.country AND S.product=A.product
GROUP BY country, product;

The query compiler 102 knows the cluster architecture for which it compiles the query and can selectively generate the code for the execution of the distributed aggregate partition functions. In a database running in a single computer, it uses the single function implementation for aggregate processing. When a single function is not implemented, it uses the accumulator and finalizer for aggregate function processing. In a database running in a single computer with multiple cores, the database runs one or more accumulators 112 per partition set in separate threads or processes and computes the final result from them in a root thread or process that runs the finalizer 114 for that data partition set.

For massively parallel processing databases in two-tier architectures, the leaf nodes execute the accumulator function 112 and the root node executes the finalizer function 114. There is no need to use the merger function 116 even if it is implemented. The compiler generates the code for the accumulator to send the intermediate results to the finalizer root node. More than two computing tiers occur when the leaf computer node processes more than one accumulator 112 per key partition set of data and/or the cluster is architected in segments. When more than two computing tiers are involved, the query compiler 102 uses the merger function 116 in all the computing nodes between the root process and the leaf processes.

When the aggregate function regression, Reg, is implemented as a single function, the input arguments from the query are passed directly to the Reg function and the output fields, namely, intercept and betaCoefficient, are retrieved from it. However, when the function is implemented as distributed processing function partitions, the following code is generated with function partitions and dataflow:

(1) RegAccumulator(S.salesValue AS Y, A.advertizementCost AS X)
OUTPUT(Sum(Y) AS SY, Sum(X) AS SX,
SUM(X*X) AS SXX, Sum(X*Y) AS SXY, Count(*) AS N)

(2) RegMerger(SY, SX, SXX, SXY, N) OUTPUT(SY, SX, SXX, SXY, N)

(3) RegFinalizer(SY, SX, SXX, SXY, N) OUTPUT(intercept, betaCoefficient)

When there are N leaf nodes in the cluster database, RegAccumulator functions are run in each node of the N nodes. Each node runs one RegAccumulation function for each combination of the partition key, for example, country and product. When RegMerger is not deployed, the result from RegAccumulator is send directly to root RegFinalizer node for each partition key. In the root node, one RegFinalizer is executed for one combination of partition key, for example, country and product. It is important to note that the intermediate result fields have the same signature in RegAccumulator's output, RegMerger's input and output, and RegFinalizer's input.

There are a number of distributed aggregate UDFs that require variable input and output fields to support variable application program models. Statistical applications that fit analytic application models such as least-squares, multivariate analysis, multiple regression and maximum likelihood fall under this category. For example, the number of independent traits required for processing multiple regression models vary for each application instance for which parameter specifying the number of independent number of traits is required. There are application program models that require more than one variable field such as least-squares. Least-squares analyses often require a number of independent discrete factors, such as sex type, age-group, year, and quarter in a model, for which one parameter field is required to specify the number of independent factors. Many least-squares models also require independent continuous or measure traits, such as advertisement cost and capital investment dollar amount to fit the least-squares model on dependent field sales value, for which another parameter field is required for expressing the number of independent measure traits. Additional parameters may also be required for expressing the interaction between different independent factors. The complexity of intermediate result fields is high for these statistical aggregate functions because of variable fields and matrix data management. These distributed aggregate functions require accumulating multiple rows of intermediate results conforming to a common matrix structure where merging functions have to keep merging input arriving from multiple leaf or merger nodes in appropriate locations of the matrix rows and columns. The finalizer node needs to merge all the input coming from the merger or leaf nodes and perform matrix operations including matrix inversions and multiplication to produce the final result.

Figure 5:
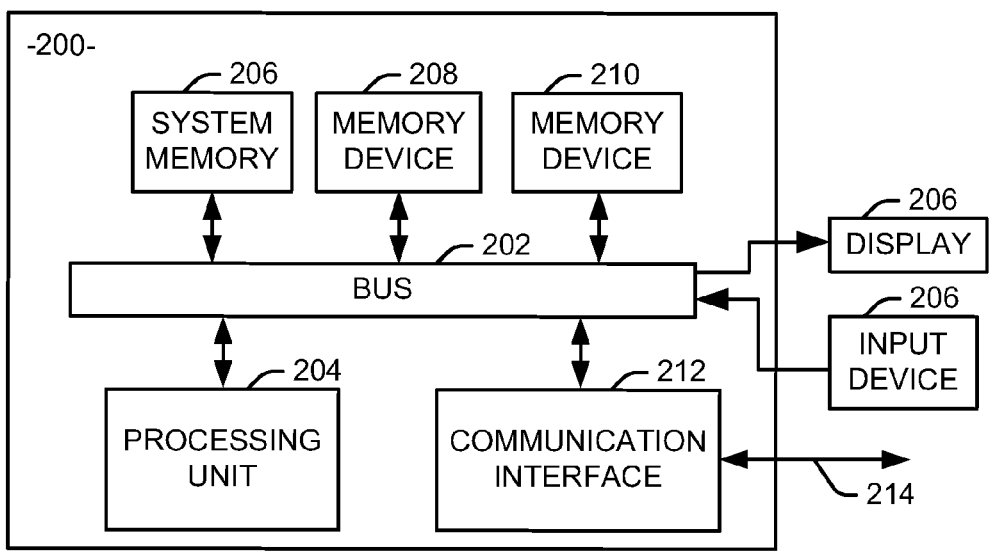
FIG. 5 is a schematic block diagram illustrating an example of a system of hardware components capable of implementing examples of the systems and methods for aggregate user defined function execution described here.

FIG. 5 is a schematic block diagram illustrating an exemplary system 200 of hardware components capable of implementing the example systems and methods for executing distributed aggregate user defined functions disclosed in FIGS. 1-4. The system 200 can include various systems and subsystems. The system 200 can be a personal computer, a laptop computer, a workstation, a computer system, an appliance, an application-specific integrated circuit (ASIC), a server, a server blade center, a server farm, or any other appropriate processing component.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio.

Additionally, the memory devices 208 and 210 can serve as databases or data storage. Additionally or alternatively, the system 200 can access an external data source or query source through the communication interface 212, which can communicate with the system bus 202 and the communication link 214.

In operation, the system 200 can be used to implement a database system that executes distributed aggregate or other user defined functions within an online analytics processing (OLAP) or GROUP BY processing framework in response to an appropriate query. The systems and methods described here can process non-OLAP analytical functions as well. The queries can be formulated in accordance with various database query syntax protocols, including SQL. Computer executable logic for implementing the distributed aggregate user defined function processing analytics system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present disclosure. It is, of course, not possible to describe every conceivable combination of components or methodologies, but one of ordinary skill in the art will recognize that many further combinations and permutations are possible. Accordingly, the present disclosure is intended to embrace all such alterations, modifications, and variations that fall within the scope of the appended claims.

What is claimed is:

1. A distributed aggregate user defined function processing system comprising:
a non-transitory computer readable medium comprising machine readable instructions executable by a processor associated with one of a plurality of processing nodes, the instructions comprising a query compiler to identify a call to a distributed aggregate user defined function, including at least one defined output field, within a query of the distributed aggregate user defined function processing system, retrieve metadata associated with the distributed aggregate user defined function, defining metadata for the plurality of function partitions comprising at least input, output, and parameter fields, and an output dependency metadata, associating an output field of the distributed aggregate user defined function with an intermediate result field used to generate the output field, such that the distributed aggregate user defined function generates only a required set of intermediate result fields to produce a set of output fields for the output field defined in the call to of the distributed aggregate user defined function and validate and resolve respective inputs, parameter fields, and outputs of a plurality of function partitions associated with the distributed aggregate user defined function according to the retrieved metadata; and a distributed processing engine, comprising the plurality of processing nodes, to execute the plurality of function partitions and organize data flow from the plurality of function partitions to produce an output for the distributed aggregate user defined function.

2. The distributed aggregate user defined function processing system of claim 1, the call to the distributed aggregate user defined function comprising an input expression defining a set of input arguments and an output expression defining a subset of output fields from a plurality of output fields associated with the distributed aggregate user defined function, the query compiler generating input and output fields for each of the plurality of function partitions such that an accumulator function partition consumes the set of user input arguments to produce an intermediate output for a merger function partition of the plurality of function partitions to consume as an input producing the same signature of output for consumption by a finalizer partition function to produce the output for the distributed aggregate user defined function.

3. The distributed aggregate user defined function processing system of claim 1, the query compiler generating an identifier number for each of the set of intermediate result fields to map the intermediate result field to an associated intermediate result metadata field and providing the generated identifier numbers to the plurality of processing nodes for processing the identified intermediate result fields as an output in an accumulator function partition of the plurality of function partitions, input and output fields in a merger function partition of the plurality of function partitions, and input fields in a finalizer function partition of the plurality of function partitions.

4. The distributed aggregate user defined function processing system of claim 1, the intermediate result field being marked as a variable field and set to depend upon one of a parameter field and an input variable field of the distributed aggregate user defined function such that the query compiler validates and resolves the intermediate result field with a repetition count, determined from the one of the parameter field and the input variable field, defining a number of variant fields and a variant identifier number for each variant field, the query compiler providing the variant identifier number for each variant field to the function partitions.

5. The distributed aggregate user defined function processing system of claim 1, further comprising a single function implementation of an aggregate user defined function that shares a function name with the distributed aggregate user defined function, the query compiler selecting, in response to a function call containing the shared function name, between the single function implementation of the aggregate user defined function and the distributed aggregate user defined function according to a query execution plan generated by the query compiler.

6. The distributed aggregate user defined function processing system of claim 1, the plurality of function partitions comprising an accumulator function partition, a merger function partition, and a finalizer function partition, and the query compiler validating and resolving processing of the plurality of function partitions such that the accumulator function partition has a first set of input fields identical to a set of input fields associated with the distributed aggregate user defined function in the query and a first set of output fields representing the intermediate result fields associated with the distributed aggregate user defined function, the merger function partition has a second set of input fields and a second set of output fields, which are each identical to the first set of output fields, and the finalizer function partition has a third set of input fields identical to the second set of output fields and a third set of output fields identical to a set of output fields associated with the distributed aggregate user defined function.

7. The distributed aggregate user defined function processing system of claim 1, the distributed aggregate user defined function comprising a validation and resolution utility function implemented as a function pointer in the metadata associated with the distributed aggregate user defined function.

8. The distributed aggregate user defined function processing system of claim 7, the validation and resolution utility function comprising a first validation and resolution utility function to validate and resolve input, output, and parameter fields of the distributed aggregate user defined function to generate intermediate result fields for the distributed aggregate user defined function and the distributed aggregate user defined function processing system further comprising a second validation and resolution utility function in metadata associated with a function partition of the plurality of function partitions for the resolution and validation of input, output and parameter fields of the function partition.

9. A method for executing a distributed aggregate user defined function on massively parallel processing cluster database system, comprising:
 identifying a call to the distributed aggregate user defined function within a query of the massively parallel processing cluster database system;
 retrieving metadata associated with the distributed aggregate user defined function, the metadata comprising input, output, and parameter fields for the distributed aggregate user defined function and output dependency metadata associating an output field of the distributed aggregate user defined function with an intermediate result field used to generate the output fields;
 resolving a plurality of intermediate result fields using the output dependency metadata from the retrieved metadata and output fields for the distributed aggregate user defined function;
 validating respective inputs, parameter fields, and outputs of a plurality of function partitions of the distributed aggregate user defined function according to the retrieved metadata and the plurality of intermediate result fields, wherein validating respective inputs, parameter fields, and outputs of the plurality of function partitions according to the retrieved metadata comprises generating only a required set of intermediate results fields to produce the output fields for the distributed aggregate user defined functions;
 developing a query plan comprising the validated inputs and outputs; and
 providing the query plan as computer executable instructions to a plurality of nodes associated with the massively parallel processing cluster database system.

10. The method of claim 9, wherein the intermediate result field comprises a plurality of intermediate result fields and validating respective inputs and outputs of the plurality of function partitions according to the retrieved metadata further comprises generating an identifier number for each of the intermediate result fields mapping the intermediate result field to an associated intermediate metadata field and providing the query plan as computer executable instructions to a plurality of nodes comprises providing the identifier number for each of the intermediate result field to the plurality of nodes.

11. The method of claim 9, wherein validating respective inputs and outputs of a plurality of function partitions according to the retrieved metadata comprises:
 generating all outputs from an accumulator function partition of the plurality of function partitions to provide a set of intermediate result fields given an input expression and parameter expression in the call to the distributed aggregate user defined function;
 generating a set of all possible outputs of a finalizer function partition of the plurality of function partitions given the set of intermediate result fields; and
 validating an output expression in the call to the distributed aggregate user defined function against the generated set of all possible outputs of the finalizer function partition.

12. The method of claim 11, wherein validating respective inputs and outputs of a plurality of function partitions of a distributed aggregate user defined function according to the retrieved metadata further comprises:
 retrieving a set of intermediate result fields from the output dependency metadata according to the output expression for the distributed aggregate user defined function in the query;
 generating the intermediate result metadata field identifier and variant field identifier for a variable intermediate result field;
 validating the accumulator function partition using input arguments from the call to the distributed aggregate user defined function in the query and the intermediate result fields;
 validating the finalizer function partition using the intermediate fields as input fields and the output fields as in an output expression of the call to the distributed aggregate user defined function in the query for the finalizer; and
 validating a merger function partition of the plurality of function partitions using the intermediate result fields as the inputs and outputs of the merger function partition.

13. A distributed aggregate user defined function processing system comprising:
 a non-transitory computer readable medium comprising machine readable instructions executable by a processor associated with one of a plurality of processing nodes, the instructions comprising a query compiler to:
 identify a call to a distributed aggregate user defined function, comprising an input expression defining a set of input arguments and an output expression defining a subset of output fields from a plurality of output fields associated with the distributed aggregate user defined function, within a query of the distributed aggregate user defined function processing system;
 retrieve metadata associated with the distributed aggregate user defined function, the metadata including input fields, output fields, and parameter fields associated with the distributed aggregate user defined function and defining an output dependency metadata that associates an output field of the distributed aggregate user defined function with an intermediate output field used for generation of the output field, such that an output object associated with the distributed aggregate user defined function generates only a required set of intermediate result fields to produce a set of output fields providing an output expression within the call to the distributed aggregate user defined function;
 validate and resolve respective inputs, parameter fields, and outputs of a plurality of function partitions associated with the distributed aggregate user defined function according to the retrieved metadata; and
 generate input and output objects, each comprising a field for each of the plurality of function partitions such that an accumulator function partition consumes the set of user input arguments to produce an intermediate output for a merger function partition of the plurality of function partitions to consume as an input producing the same signature of output for consumption by a finalizer partition function to produce the outputs for the distributed aggregate user defined function; and a distributed processing engine, comprising the plurality of processing nodes, to execute the plurality of function partitions and organize data flow from the accumulator function partition to the merger function partition to the finalizer function partition to produce an output for the distributed aggregate user defined function.

\* \* \* \* \*

UNITED STATES PATENT AND TRADEMARK OFFICE
CERTIFICATE OF CORRECTION

PATENT NO.        : 8,538,954 B2                                      Page 1 of 1
APPLICATION NO.   : 13/364155
DATED             : September 17, 2013
INVENTOR(S)       : Muthian George et al.

It is certified that error appears in the above-identified patent and that said Letters Patent is hereby corrected as shown below:

In the Claims

In column 19, line 57, in Claim 1, delete "to of" and insert -- to --, therefor.

Signed and Sealed this
Third Day of December, 2013

Margaret A. Focarino
*Commissioner for Patents of the United States Patent and Trademark Office*